US011481015B2

(12) United States Patent
Delshadpour et al.

(10) Patent No.: US 11,481,015 B2
(45) Date of Patent: Oct. 25, 2022

(54) POWER CONSUMPTION MANAGEMENT IN PROTOCOL-BASED REDRIVERS

(71) Applicant: NXP B.V., Eindhoven (NL)

(72) Inventors: Siamak Delshadpour, Phoenix, AZ (US); Abhijeet Chandrakant Kulkarni, Chandler, AZ (US); Hans de Kuyper, Leuven (BE); Cornelis Johannes Speelman, Wijchen (NL)

(73) Assignee: NXP B.V., Eindhoven (NL)

( * ) Notice: Subject to any disclaimer, the term of this patent is extended or adjusted under 35 U.S.C. 154(b) by 675 days.

(21) Appl. No.: 16/452,012

(22) Filed: Jun. 25, 2019

(65) Prior Publication Data

US 2020/0409444 A1 Dec. 31, 2020

(51) Int. Cl.
  *G06F 1/3234* (2019.01)
  *G06F 1/3206* (2019.01)
  *H04L 25/02* (2006.01)
  *H04L 25/03* (2006.01)

(52) U.S. Cl.
  CPC .......... *G06F 1/3234* (2013.01); *G06F 1/3206* (2013.01); *H04L 25/0286* (2013.01); *H04L 25/0298* (2013.01); *H04L 25/03878* (2013.01)

(58) Field of Classification Search
  CPC . G06F 1/3234; G06F 1/3206; H04L 25/0286; H04L 25/0298; H04L 25/03878
  See application file for complete search history.

(56) References Cited

U.S. PATENT DOCUMENTS

| | | | |
|---|---|---|---|
| 8,610,463 B2 | 12/2013 | Yeung et al. | |
| 8,645,724 B2 | 2/2014 | Jaramillo | |
| 8,797,067 B1* | 8/2014 | Tan | H04L 25/03343 327/47 |
| 2008/0235526 A1* | 9/2008 | Lee | G06F 1/324 713/320 |
| 2010/0105319 A1* | 4/2010 | Yeung | H04L 25/0278 455/7 |
| 2012/0307154 A1* | 12/2012 | Wang | G09G 5/008 348/E5.062 |
| 2012/0311359 A1* | 12/2012 | Jaramillo | H04L 25/0298 713/321 |
| 2013/0054866 A1* | 2/2013 | Saito | G06F 1/325 710/313 |
| 2014/0173303 A1* | 6/2014 | Chen | G06F 1/3253 713/310 |
| 2015/0227489 A1* | 8/2015 | Chen | G06F 13/385 710/313 |
| 2015/0363350 A1* | 12/2015 | Yeung | G06F 13/4221 710/106 |
| 2017/0019105 A1* | 1/2017 | Xiao | G06F 13/00 |

(Continued)

*Primary Examiner* — Gary Collins

(57) ABSTRACT

A redriver chip includes a controller and a plurality of circuits coupled to the channel. The controller adjusts a set of parameters of the plurality of circuits to have first values during a first mode of operation and second values during a second mode of operation. The first values generate a first level of power consumption during the first mode of operation, and the second values generate a second level of power consumption during the second mode of operation. The first level of power consumption is lower than the second level of power consumption, and the first mode of operation corresponding to a low-power mode of the redriver chip.

16 Claims, 11 Drawing Sheets

(56) References Cited

U.S. PATENT DOCUMENTS

| | | | | |
|---|---|---|---|---|
| 2018/0287771 A1* | 10/2018 | Srivastava | .......... | G06F 13/4072 |
| 2019/0288743 A1* | 9/2019 | Wang | .................. | H03F 3/45183 |
| 2019/0340146 A1* | 11/2019 | Chen | .................... | H03K 5/2481 |
| 2020/0272592 A1* | 8/2020 | Chan | ..................... | G06F 13/382 |

* cited by examiner

POWER CONSUMPTION MANAGEMENT IN PROTOCOL-BASED REDRIVERS

TECHNICAL FIELD

Example embodiments disclosed herein relate generally to managing power in a circuit.

BACKGROUND

The integrity of signals travelling through a cable or the traces of a printed circuit board may degrade because of loss and inter-symbol interference, especially at relatively higher frequencies. A redriver may be used to solve this problem. A redriver applies equalization to compensate for channel loss and outputs signals with a high differential voltage. This may allow longer cables to be used and may promote compliance with applicable protocols and cable/connector standards.

A redriver may operate in a power-saving mode depending on programming and/or existing conditions. One type of power-saving mode is a low-current mode. Examples of low-current modes include USB3.2 Gen2x2 or Gen1x2: U2/U3 states, USB3.2 Gen2x1 or Gen1x1: U2/U3 states, no connection detected yet (USB RX detection enabled), DP1.5 sleep D3 mode, Thunderbolt3/USB4 (1 Lane): Low-Power CL1/CL2, and Thunderbolt3/USB4 (2 Lane): Low-Power CL1/CL2.

When operating in a deep power-saving mode, a redriver should not consume, for example, more than few microamps (uA) of current. However, when a redriver is in a state ready for high-speed channel(s) to power up, existing redrivers consume high amounts of current. When operating based on battery power, a high level of power consumption may quickly drain the battery.

SUMMARY

A brief summary of various example embodiments is presented below. Some simplifications and omissions may be made in the following summary, which is intended to highlight and introduce some aspects of the various example embodiments, but not to limit the scope of the invention. Detailed descriptions of example embodiments adequate to allow those of ordinary skill in the art to make and use the inventive concepts will follow in later sections.

Example embodiments include a redriver chip which includes a channel, a plurality of circuits coupled to the channel, and a controller configured to adjust a set of parameters of the plurality of circuits to have first values during a first mode of operation and to adjust the set of parameters to have second values during a second mode of operation. The first values generate a first level of power consumption during the first mode of operation and the second values generate a second level of power consumption during the second mode of operation. The first level of power consumption is lower than the second level of power consumption, and the first mode of operation corresponds to a low-power mode of the redriver chip. The controller may perform the low-power mode before the channel is enabled.

The plurality of circuits may include at least one signal detector, at least one common-mode keeper, a circuit to generate or select a clock signal, and at least one circuit operating based on a bias current. The set of parameters may include a frequency of the clock signal, an enable state of the at least one signal detector, a current level of the at least one common-mode keeper, and a current level of the at least one circuit operating based on the bias current. The first value of the clock signal may be a first frequency, the second value of the clock signal may be a second frequency, and the first frequency may be lower than the second frequency.

The first value of the enable state of the at least one signal detector may control periodic enabling of the at least one signal detector, and the second value of the enable state of the at least one signal detector may control periodic enable or continuous enabling of the at least one signal detector. The at least one signal detector may include at least one of a receiver detector and a squelch detector. The first value of the current level of the at least one common-mode keeper may be lower than the second value of the current level of the at least one common-mode keeper. The first value of the current level of the at least one circuit operating based on the bias current may be less than the second value of the current level of the at least one circuit operating based on the bias current. At least one of the plurality of circuits may be self-biased.

In accordance with one or more embodiments, a method for managing power includes enabling a first mode of operation of a redriver, adjusting a set of parameters of a plurality of circuits to have first values during the first mode of operation where the plurality of circuits coupled to a channel of the redriver, enabling a second mode of operation of the redriver, and adjusting the set of parameters of the plurality of circuits to have second values during the second mode of operation. The first values generate a first level of power consumption during the first mode of operation, and the second values generate a second level of power consumption during the second mode of operation The first level of power consumption is lower than the second level of power consumption, and the first mode of operation corresponds to a low-power mode of the redriver chip. The low-power mode may be enabled before the channel is enabled.

The plurality of circuits may include at least one signal detector, at least one common-mode keeper, a circuit to generate or select a clock signal, and at least one circuit operating based on a bias current. The set of parameters may include a frequency of the clock signal, an enable state of the at least one signal detector, a current level of the at least one common-mode keeper, and a current level of the at least one circuit operating based on the bias current. The first value of the clock signal may be a first frequency, the second value of the clock signal may be a second frequency, and the first frequency may be lower than the second frequency.

The first value of the enable state of the at least one signal detector may control periodic enabling of the at least one signal detector, and the second value of the enable state of the at least one signal detector may control periodic enable or continuous enabling of the at least one signal detector. The at least one signal detector may include at least one of a receiver detector and a squelch detector. The first value of the current level of the at least one common-mode keeper may be lower than the second value of the current level of the at least one common-mode keeper. The first value of the current level of the at least one circuit operating based on the bias current may be less than the second value of the current level of the at least one circuit operating based on the bias current. The at least one of the plurality of circuits may be self-biased.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

Figure 1A:
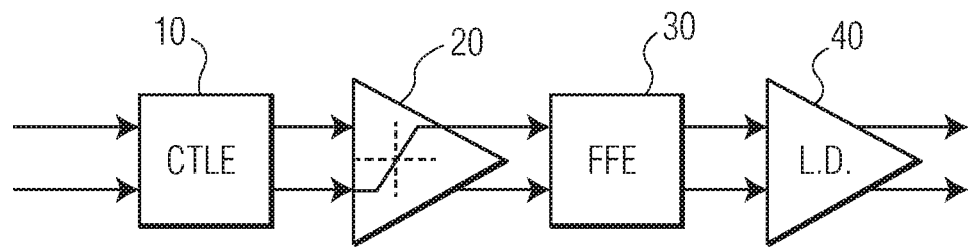
FIG. 1A illustrates an embodiment of a limiting redriver.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Figure 1B:
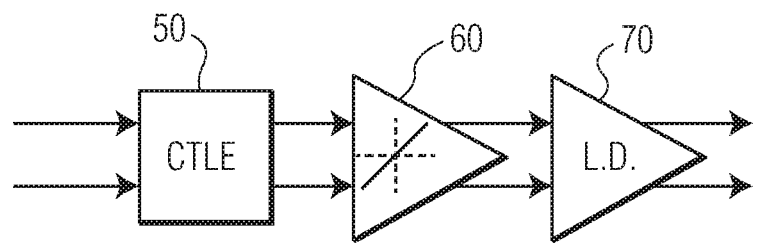
FIG. 1B illustrates an embodiment of a linear redriver.

FIGS. 1A and 1B illustrate embodiments of a redriver, which includes one or more channels for transferring data between a host system and a connected device. The channels may include at least one high-speed channel that conforms to a predetermined standard. In one embodiment, the redriver may be a combination redriver that supports a plurality of standards, including but not limited to various versions of Universal Serial Bus (USB), Display Port (DP), Thunderbolt (TBT), and/or converged input/output (CIO). The redriver may be on a chip with circuits for controlling parameters relating to power management, signal detection, clock generation, common mode control, and/or bias current, as well as others. For purposes of convenience, the redriver will referred to as a redriver chip in the following discussion.

The redriver chip implements a dynamic, complex approach that reduces power consumption in one or more low-power modes, including those implemented before the high-speed channel is enabled. In one embodiment, the redriver chip performs a plurality of circuit and system level techniques to adjust parameters relating to operation of the channel. The circuit and system level techniques may include adjusting the frequency of clock signals for controlling one or more redriver circuits, adjusting duty cycle, implementing various bias strategies, squeezing current of a common mode keeper coupled to the channel, and selectively enabling one or more redriver circuits (e.g., a squelch detector, termination detection, etc.) instead of operating these circuits on a continuous basis.

In one embodiment, all of these techniques may be applied, in whole or part, simultaneously or in a predetermined order, to reduce power consumption of the redriver chip. At least some of the power-saving techniques may be integrated (e.g., in terms of timing, functional requirements, or operational pre-requisites), so that implementation of one technique makes possible the performance of one or more other techniques. Taking this integrated approach improves efficiency, which, in turn, may further reduce the rate at which power is consumed. (Simulations of the embodiments described herein showed at least one order of magnitude improvement over the power consumption of existing redriver chips.) By reducing power consumption, the embodiments may also be effective in extending the life of a battery in the host system or connected device.

Referring to FIG. 1A, the redriver chip in this embodiment includes an equalizer 10, a limiting amplifier (slicer) 20, an emphasis driver 30, and a transmission line driver 40. A redriver having this configuration may be referred to as a limiting redriver. The equalizer 10 may be, for example, a continuous time linear equalization (CTLE) filter that attenuates low-frequency signal components in an incoming signal received along a channel of the redriver chip. The limiting amplifier 20 may operate to compress, stabilize, and provide constant output level for the signals carried on the channel. The emphasis driver 30 may perform transmitter feed-forward equalization (FFE), which may boost higher frequency components of the channel signals (pre-emphasis) or decrease lower frequency components of the channel signals (de-emphasis). The line driver (LD) 40 may drive transmission of the channel signals to the host system or connected device. The output of the limiting redriver may not match the signal source. Also, the limiting redriver may or may not require link training.

Referring to FIG. 1B, the redriver chip in this embodiment includes a linear equalizer (CTLE) 50, a gain stage 60, and a linear transmission line driver (LD) 70. A redriver having this configuration may be referred to as a linear redriver. The linear equalizer 50 and line driver 70 may perform operations similar to those in FIG. 1A. The gain amplifier 60 may increase the gain of the channel signals by a predetermined gain. The output of the linear redriver may match the signal source. Also, the linear redriver requires link training. In order to make the high-speed channel(s) of the limiting and linear redrivers compliant with multiple standards (e.g., USB/DP/TBT/CIO), a number of supporting circuits may be added, some of which are described below.

Figure 2:
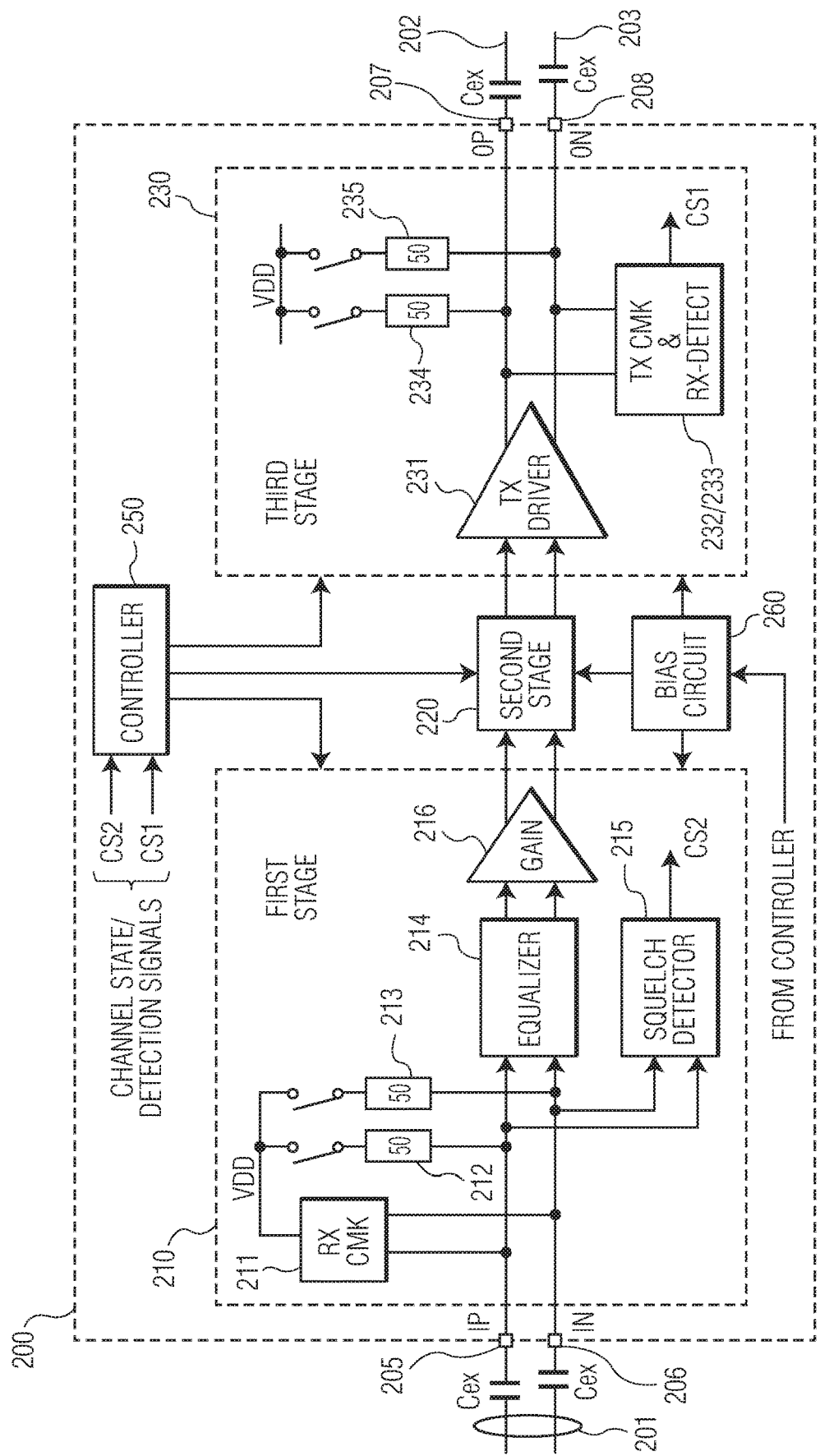
FIG. 2 illustrates another embodiment of a redriver.

FIG. 2 illustrates an embodiment of a redriver chip 200 which may correspond, for example, to the linear redriver chip of FIG. 1B. In this embodiment, a single high-speed channel 201 is shown, but one or more additional channels may be included in another embodiment. The high-speed channel 201 may be a differential channel including a first signal line 202 and a second signal line 203. The first signal line may be a positive signal line (IP) and the second signal line may be a negative signal line (IN). A pair of external capacitors (Cex) may be coupled to the signal lines of the channel prior to input pins 205 and 206 of the redriver chip. Another pair of external capacitors (Cex) may be coupled to the signal lines of the channel after output pins 207 and 208. While the redriver chip 200 in FIG. 2 is identified as a linear redriver, the redriver chip of FIG. 2 may be implemented as a limiting redriver, for example, corresponding to FIG. 1A.

The redriver chip 200 includes a first stage 210, a second stage 220, and a third stage 230. The first stage 210 may be a receiver circuit which includes a common mode keeper (RX CMK) 211, termination resistors 212 and 213 coupled to respective lines of the channel 201, an equalizer 214, a squelch detector 215, and a gain amplifier 216.

The common mode keeper 211 may maintain the common mode voltage of the receiver pins 205 and 206 close to (e.g., within a predetermined range of) the DC level of the functional voltage of the high-speed channel (redriver). In one embodiment, the common mode keeper 211 may be maintained in an enabled state throughout normal and power-saving modes, for example, in order to maintain sufficient charge on large external capacitors Cex and to maintain DC levels of the receiver at a predetermined level. The predetermined level may be, for example, a level sufficient to ensure fast power-up of the channel.

The termination resistors 212 and 213 are coupled between a power supply VDD and respective signal lines of the channel. In operation, the termination resistors may provide impedance matching on the receiver side of the redriver chip. The resistors may have the same resistance values, which in one illustrative case may be 50Ω.

The equalizer 214 may be, for example, a continuous time linear equalization (CTLE) filter which attenuates (or amplifies, depending upon the system it has been designed for) low-frequency signal components of signals and amplifies high frequency signal components received on channel.

The squelch detector 215 performs low-frequency or high-frequency signal/loss detection, for example, depending on the functional mode of the redriver being implemented.

The gain amplifier 216 may apply a predetermined gain to the channel signals in order to comply with one or more standards.

The second stage 220 may include a gain amplifier, one or more delay cells, a buffer, an emphasis stage (pre-emphasis or de-emphasis), or another circuit. The type of emphasis stage may be included, for example, depending on the type of redriver, e.g., when the redriver is a limiting redriver as opposed to a linear redriver. In one embodiment, the second stage 220 may be omitted.

The third stage 230 may be a transmitter circuit which includes a transmission (TX) driver 231, a common mode keeper (TX CMK) 232, a (RX) detector 233, and termination resistors 234 and 235.

The transmission (TX) driver 231 adjusts the gain of the channel signals output from the second stage (or first state if the second stage is omitted) to conform to a predetermined standard.

The TX CMK 232 may maintain the common mode voltage of the transmitter pins 207 and 208 of the chip close to (e.g., within a predetermined range of) the DC level of the functional voltage of the redriver. In one embodiment, the common mode keeper 232 may be maintained in an enabled state throughout normal and power-saving modes, for example, in order to maintain sufficient charge on large external capacitors Cex and to maintain DC levels of the transmitter at a predetermined level. The predetermined level may be, for example, a level sufficient to ensure fast power-up of the channel. The transmitter pin 207 may be positive pin (OP) and the transmitter pin 208 may be a negative pin (ON) in one embodiment.

The RX detector 233 detects the presence of activity on the channel, which, for example, may include the reception of any type of signals received by the redriver chip. In one embodiment, the detector 233 may be coupled together or located within a same stage or circuit.

The termination resistors 234 and 235 serve as far-end terminations that allow a determination to be made as to whether a cable or other interface has been connected between the host system and device. The termination resistors also perform an impedance matching function. In one embodiment, the termination resistors may have the same resistance values, e.g., 50Ω.

In operation, the high-speed channel of the redriver chip 200 may transition from a low-power saving mode to another mode (e.g., power-up mode) based on a predetermined command. The low-power saving mode may be performed before the high-speed channel is enabled. Transitions from the low-power saving mode may be performed, for example, by enabling the channel based on an inter-integrated circuit (I²C) command. In another embodiment, the high-speed channel may be enabled based on a sequence of events on the low-speed sideband. In another embodiment, the high-speed channel may be enabled based on low-speed activity occurring on the channel. Enabling of the channel may be performed, for example, by a controller, which may be located on the same chip of the redriver or which may reside off-chip, for example, in the host system or connected device. An example of an on-chip controller 250 is illustrated in FIG. 2.

In accordance with one embodiment, the high-speed channel of the redriver chip 200 may be enabled as follows. First, the RX detector 233 in the third stage transmitter circuit 230 detects a far-end 50Ω termination on the channel which its receiver is connected to TX. When this occurs, the RX detector 233 may output a first control signal CS1 to enable the first stage receiver circuit 210. In one embodiment, the first control signal CS1 may enable at least the squelch detector 215 in the first stage 210. In another embodiment, the first control signal CS1 may be a detect signal input into the controller 250. When this signal is received, the controller 250 may output one or more control signals for enabling the squelch detector 215 and/or other features in the first stage 210. The controller 250 may also generate control signals for enabling the second and third stage circuits at this time, or the second and third stage circuits may be enabled at a subsequent time, e.g., in response to a detect signal output from the squelch detector. Once enabled, the squelch detector 215 performs a monitoring operation which involves detecting an input signal on the high-speed channel through input pins 205 and 206.

When an input signal is detected by the squelch detector 215, the squelch detector 215 outputs a second control signal CS2 to enable (e.g., power) the high-speed channel. The channel may be enabled by applying predetermined power to the channel circuits. The predetermined power may be at a power-up level, which, for example, may be different from the level of power applied during a normal or active mode of the redriver chip. The detected input signal may be a low-speed signal and/or a high-speed signal. If a high-speed signal is detected, the high-speed signal may be passed through the channel.

The termination resistors 234 and 235 in the third stage transmitter circuit may be enabled as part of the high-speed channel, e.g., switches associated with the terminal resistors may be switched on in order to couple the different lines of the input channel to the voltage supply VDD. The termination resistors may be enabled at the same time the other channel circuits are enabled or at a different time (before or after) from the channel circuits. Channel core enabling may depend, for example, on various predetermined strategies. The following circuits may be enabled or connected during channel core enabling: termination resistors 212 and 213, equalizer 214, squelch detector 215, second stage 220 (if included), TX driver 231, and termination resistors 234 and 235. The loss of signal (LOS) detector may be maintained in an on state. When the LOS detector (e.g., the squelch detector may also detect loss of signal) 215 detects losses in the traffic on the high-speed channel, the channel may be disabled, for example, based on one or more control signals output from the controller 250.

The controller 250 of the redriver chip 200 may generate control signals for implementing a plurality of circuit and/or system level techniques for the purpose of reducing power consumption in at least two low-power modes. The first low-power mode involves enabling the high-speed channel after a connection is detected, e.g., after RX detector 233 detects the presence of a signal on the high-speed channel (e.g., USB signal), after the RX detector 233 performs a data port (DP) hot plug detection (HPD), or after detection of a signal corresponding to another standard. The second operational mode involves enabling the high-speed channel after detection of signaling during a (connected) power-saving state in accordance with one or more standards, e.g., USB U2/U3, DP D3, etc. The circuit and/or system level techniques for reducing power consumption may be applied to different operational modes in another embodiment.

In order to reduce current consumption in any one of a plurality of low-power modes, the combination redriver chip may implement one or any combination of the following techniques simultaneously or in a predetermined order.

Clock Frequency Adjustment

The redriver chip 200 may include or be coupled to a dual-mode clock which generates signals to control operation of the channel circuits. In order to reduce power consumption, the frequency of the dual-mode clock may be reduced to a predetermined lower rate when the redriver chip (or channel) is operating in one or more low-power modes. The frequency of the dual-mode clock may be controlled, for example, by controller 250 based on the detection of or programmed entry into one or more of the low-power modes. In one embodiment, the dual-clock mode may generate clock signals at the lower rate at start-up of the redriver chip. While the term 'dual-mode clock' suggests that the clock operates in only two modes (or outputs only two possible clock signal frequencies), the clock may operate in more than two modes (or output more than two clock signal frequencies) in another embodiment. For example, the dual- or multi-mode clock may output clock signals at different frequencies for different low-power modes in order to manage power consumption in the redriver chip relative to one or more of its high-speed channels.

In one embodiment, the controller 250 may include a digital state machine that generates signals for controlling the redriver chip. In one embodiment, the digital state machine may use a clock to run timers and various ones of the channel circuits. Because dynamic current consumption increases for higher clock frequencies, the root frequency of the clock may be adjusted by the digital state machine based on the operational mode of the redriver. For example, the clock may be adjusted to output signals in a first frequency range for normal or active mode(s) of the redriver chip and may be adjusted to output signals in a second frequency range for one or more other modes of the redriver chip, including low-power modes. Reducing the clock frequency reduces the power consumed by an oscillator circuit used to generate the clock signals, as well as circuits that are driven by the clock signals. In one embodiment, the digital state machine may include a clock tree with states that correspond to the different operational (including low-power) modes of the redriver chip. The low-power modes may be implemented before the high-speed channel is enabled, or one or more of those modes may be implemented after the high-speed channel is enabled.

When the redriver chip includes digital control circuits, the dual-mode clock should receive a smooth glitch-free transition of frequency within a "designed certain time" between two frequencies. In one embodiment, a lower clock frequency may be set to some predetermined fraction (e.g., $\frac{1}{10}$) of the clock frequency used during a normal or active mode of operation of the redriver chip. The ratio of clock the clock frequencies used in low and normal power modes may be determined, for example, based on system and/or standard timing and technology limitations.

Figure 3:
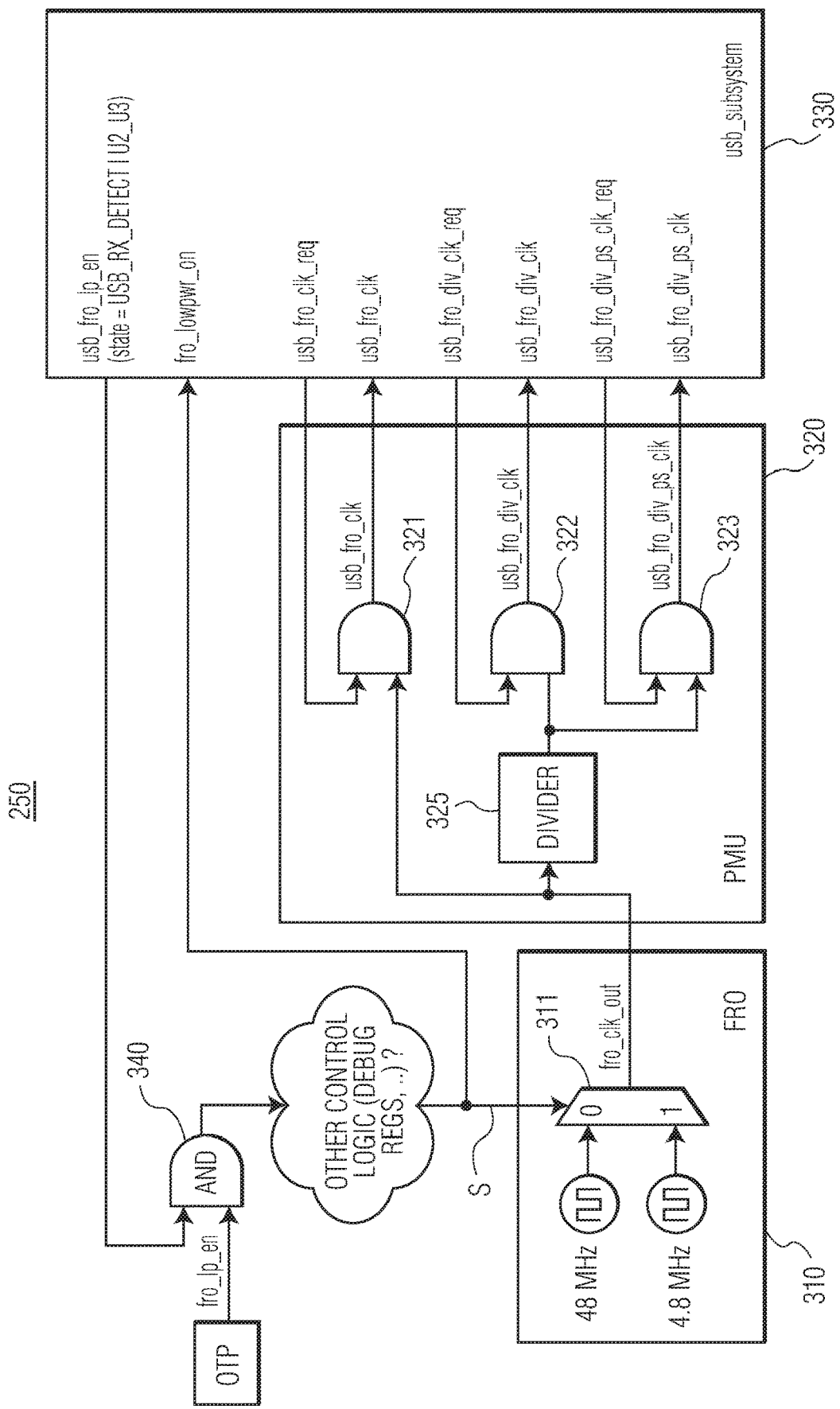
FIG. 3 illustrates an embodiment for adjusting clock signal frequency.

FIG. 3 illustrates an embodiment of controller 250 which generates control signals for adjusting frequency of clocks signals for different modes of the redriver chip. In this embodiment, the controller 250 includes (or is coupled to one or more of) a free running oscillator (FRO) 310, a power management unit (PMU) 320, and a subsytem 330, which for illustrative purposes has been labeled a USB subsystem (but may correspond to a different standard in another embodiment).

The FRO 310 may include a selector (e.g., multiplexer) 311 which outputs one of a plurality of clock signals at different frequencies. For example, the selector may output a first clock signal at a first frequency (e.g., 48 MHz) or a second clock signal at a second frequency (e.g., 4.8 MHz) lower than the first frequency. In one embodiment, the second frequency may be a predetermined fraction (e.g., $\frac{1}{10}$) of the first frequency.

The PMU 320 includes logic for outputting the selected clock signal from the free running oscillator 310. First logic 321 outputs the selected clock signal from the FRO. A divider 325 divides the selected clock signal into a plurality of divided clock signals (e.g., divided in terms of frequency) based on one or more ratios dividing factors, e.g., 2, 4, 8, 16, etc. One of the divided signals may be output to the USB subsystem 330 based on a request (usb_fro_clk_req) for the clock signal from the USB subsystem 330. This may be accomplished, for example, by passing the divided clock signals through a number of logic gates 322 and 323, which generate outputs based on corresponding clock request signals (usb_fro_div_clk_req and usb_fro_div_ps_clk_req).

The USB subsystem 330 detects the state of the channel 201 (or the redriver chip) based on the control signal CS1 output from the RX detector 233. When the control signal CS1 indicates that the channel (or redriver chip) is in one or more predetermined low-power modes, e.g., U2 or U3 for a USB standard, the USB subsystem 330 outputs a control signal (usb_frp_lp_en) to logic 340, which generates the select signal S for selector 311 based on the value of a one-time programming (OTP) enable signal. The select signal may also be input into a low-power-on input of the USB subsystem 330 to initiate low-power control for the redriver chip.

Figure 4:
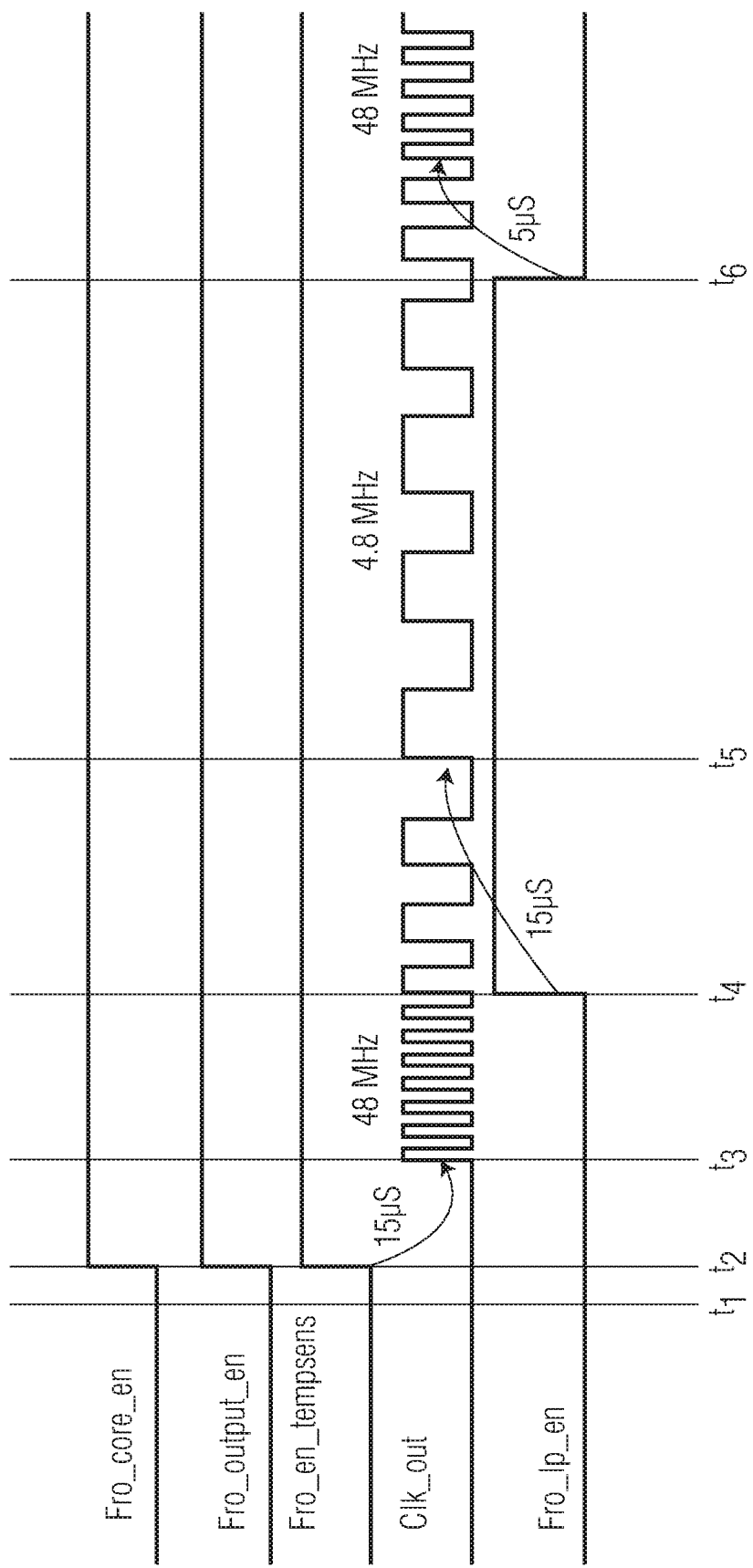
FIG. 4 illustrates an embodiment of a timing diagram for adjusting clock signal frequency.

FIG. 4 illustrates an embodiment of a timing diagram for changing the frequency of a clock signal, for example, using the controller 250 of FIG. 3. At time t1, the FRO 310 and its attendant circuits are disabled, as is evident from the logical zero values of the Fro_core_en, Fro_output_en, and Fro_en_tempsens signals. As a result, no clock Clk_out is output from the clock and the low-power mode enable signal of the Fro is also zero.

At time t2, the enable signals transition to a logical 1 to enable the FRO and PMU. These enable signals may be generated, for example, when the USB subsystem 330 detects the presence of a predetermined low-power mode on the high-speech channel, based on the output of the RX detector 233 of the redriver chip.

At time t3, the FRO begins outputting the first clock signal at the faster first frequency (e.g., 48 MHz).

At time t4, after a period of time (e.g., 15 µs), the selector 311 of the FRO receives the control signal S to select the second clock signal at the lower second frequency (e.g., 4.8 MHz), because a predetermined low-power mode (e.g., programmed into the digital state machine of the controller 250) has been detected. Thus, at time t4, the FRO reduces the clock frequency to the second clock frequency, which may be gradually performed at a predetermined rate over a period of time (e.g., another 15 µs).

At time t5, the output of the FRO reaches the second frequency and is maintained for a time, e.g., until the high-speed channel is no longer detected to be in the predetermined low-power mode. This may involve the high-speed channel transitioning to a normal/active power mode or another mode. The transition is indicated by the change in state of the FRO_lp_en signal, which changes from a logical one to a logical zero value, at time t6. The FRO then begins to increase the clock frequency back to the first frequency. In one embodiment, the FRO may be an oscillator. In this case, as is evident from the timing diagram in FIG. 4, the oscillator gradually changes the output clock frequency from the fast first frequency (48 MHz) to the slower second frequency (4.8 MHz) and back again to the fast first frequency (4.8 MHz). Operating the redriver at the second frequency produces a corresponding reduction in power consumption.

Bias Current Adjustment

The redriver chip 200 may include, or be coupled to, a bias circuit 260 (see FIG. 2) which provides bias current for the first, second, and/or third stage circuits. The high-speed channel may require a predetermined source current (e.g., 100 uA) to provide bias currents in the mA range for biasing circuits such as the equalizer 214, TX driver 231, and/or other circuits which may use a high reference current.

Figure 5:
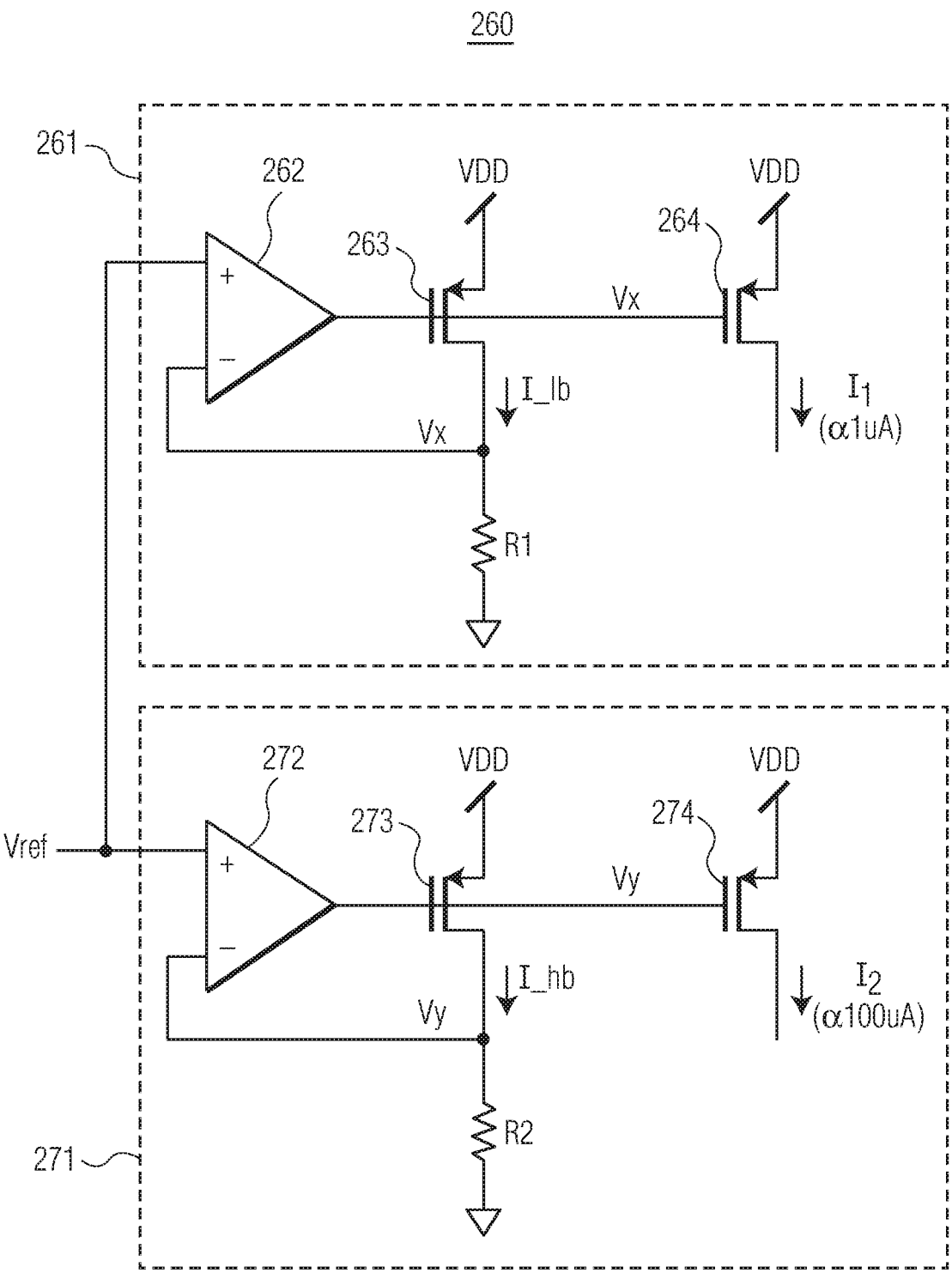
FIG. 5 illustrates an embodiment of a bias current generator.

FIG. 5 illustrates an embodiment of a bias circuit 260 for generating bias current for the redriver chip. The bias circuit 260 may be a dual-mode bias circuit including a first stage 261 for generating a first bias current of a first level and a second stage 271 for generating a second bias current of a second level greater than the first level. For example, the first level may be approximately 1 uA and the second level may be approximately 100 uA (or a few uA and a few hundred uA, respectively).

The first stage 261 includes a first operational transconductance amplifier (OTA) 262, a first transistor 263, and a second transistor 264. A first terminal (+) of the first OTA is coupled to receive a reference voltage Vref and a second terminal (−) of the first OTA is coupled to receive a voltage controlled by the value of a resistor R1. This voltage is based on a supply voltage VDD passing through the first transistor 263, and the second transistor 264 is responsible for outputting the first bias current $I_1$ to the redriver circuits. In operation, Vx=Vref in a feedback loop where I_lb=Vref/R1.

The second stage 271 is similar to the first stage in that it includes an OTA 272, a first transistor 273 and a second transistor 274. However, the resistance value R2 in the second stage is different from the resistor value R1 in the first stage, and I_lb=Vref/R2 in operation. The second bias current is set to be greater than the first bias current for matching purposes. When the redriver is operating in a low-power mode, applying this large current is unnecessary because the circuit(s) of the redriver to be biased require much lower bias current in low-power mode. Most of the second bias current would therefore be wasted if it were supplied during low-power mode. To reduce power consumption, the first stage outputs the lower first bias current to the redriver circuits in low-power mode, which may include modes performed before the high-speed channel is enabled and/or one or more modes after enabling of the channel. The circuits receiving the bias current may include, for example, the RX CMK 211, the RX detector 233, and squelch detector 215. In one embodiment, the OTAs may be replaced by operational amplifiers (op amps). (The enable/disable mechanisms of the low power and high power bias circuits are not illustrated, but may correspond, for example, to on-chip controller).

CMK Current Adjustment

In the redriver chip 200, the input/output pins are coupled to external AC coupling capacitors (Cex). Because these capacitors have relatively large capacitance, charging capacitors Cex to DC level or an operational point of the TX driver (e.g., channel start time) may take a relatively long time. This long charge time may prevent the redriver chip from satisfying the timing requirements of USB, DP, and/or other standards. The common-mode keepers RX CMK 211 and TX CMK 232 may be included in the first and last stages of the redriver in order to maintain the channel inputs/outputs at a predetermined low DC level when the high-speed channel is disabled.

Figure 6A:
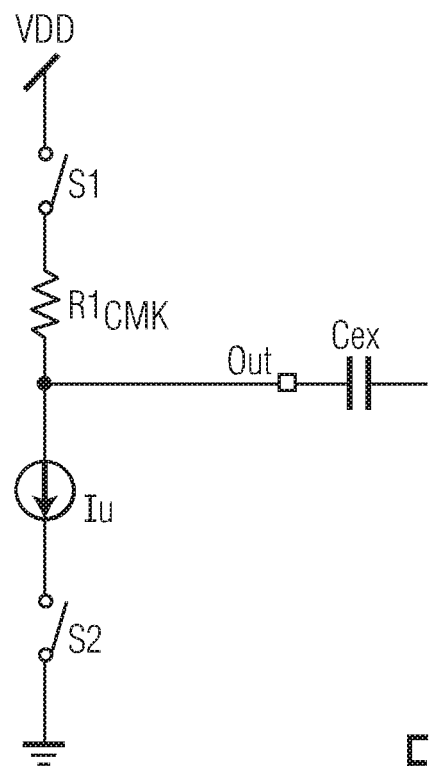
FIG. 6A illustrates an embodiment of a common-mode keeper.

FIG. 6A illustrates one embodiment of a common-mode keeper, which, for example, may correspond to RX CMK 211 and TX CMK 232. 2. Referring to FIG. 6A, the common-mode keeper includes a switch S1 coupled to an input/output pin (OUT) through a resistor $R1_{CMK}$. The input/output pin (which may be any one of pins 205, 206, 207, or 208) is coupled to a current source $I_u$ and an external capacitor Cex. In addition, the current source $I_u$ may be coupled to a reference potential (e.g., ground) through a second switch S2. The first and second switches S1 and S2 may be switched on at the same time based on control signals from controller 250.

In operation, a voltage equal to $VDD-I_u*R1_{CMK}$ may define the DC level for the channel. In order to reduce power consumption, $R1_{CMK}$ may be made larger and $I_u$ smaller. This will result in lowering the common-mode keeper current. This technique may be applied, for example, during one or more of the low-power modes of the redriver chip and/or when the high-speed channel is disabled, as discussed herein.

In one embodiment, $R1_{CMK}$ may be a variable resistor having a resistance value controlled by controller 250. In this or another embodiment, controller 250 may control the value of the current source $I_u$. In another embodiment, one of $R1_{CMK}$ may be larger and $I_u$ may be fixed and the other value may be controlled, e.g., resistor $R1_{CMK}$ may have a fixed resistance and the current source $I_u$ is controlled to achieve a desired DC level when the high-speed channel is disabled, and in various operational modes. In the embodiment of FIG. 6A, a trade-off may exist between area/current and matching of $I_u*R1_{CMK}$, e.g., current may come from low-power bias circuit and may be proportional to $V_{bg}/R1_{CMK}$.

Figure 6B:
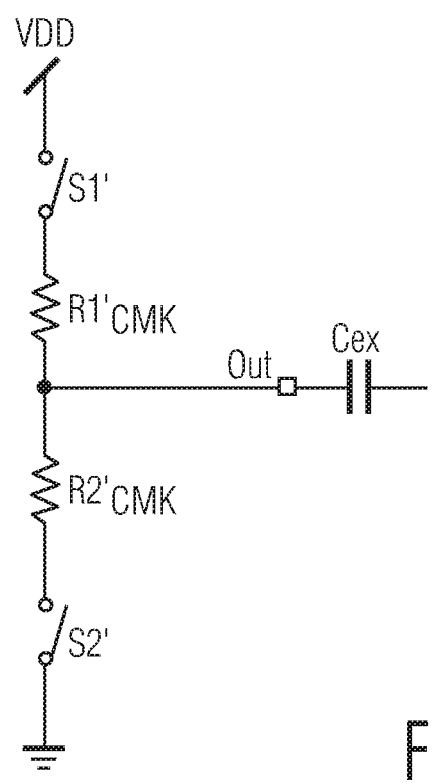
FIG. 6B illustrates another embodiment of a common-mode keeper.

FIG. 6B illustrates another embodiment of a common-mode keeper that may be implemented in the redriver chip. Referring to FIG. 6B, the common-mode keeper includes a voltage divider circuit formed from resistors $R1'_{CMK}$ and $R2'_{CMK}$. A voltage source Vdd is coupled to the voltage divider through a first switch S1', and a node between the resistors is coupled to output a divided voltage (based on the ratio of $R1'_{CMK}$ and $R2'_{CMK}$) to an input/output pin (OUT). The input/output pin (which may be one of pins 205, 206, 207, or 208) is coupled to an external capacitor Cex. In addition to these features, a second switch S2' selectively couples the voltage divider to a reference potential, e.g., ground. The first and second switches may be switched on at the same time. In operation, the output DC level is set by the resistor divider ratio of $R1'_{CMK}$ and $R2'_{CMK}$ as (VDD* $(R1'_{CMK})/(R1'_{CMK} R2'_{CMK})$. The Area, passing DC current, and the charging time of the external capacitor Cex defines a trade-off for setting acceptable values of $R1'_{CMK}$ and $R2'_{CMK}$.

Periodic Enabling of RX Detector

The RX detector 233 performs far-end termination detection. In principal, the RX detector may perform this operation in the manner illustrated in FIG. 7A, which depicts the redriver chip 700 including the high-speed channel 201, labeled HS Ch. in this example.

Figure 7A:
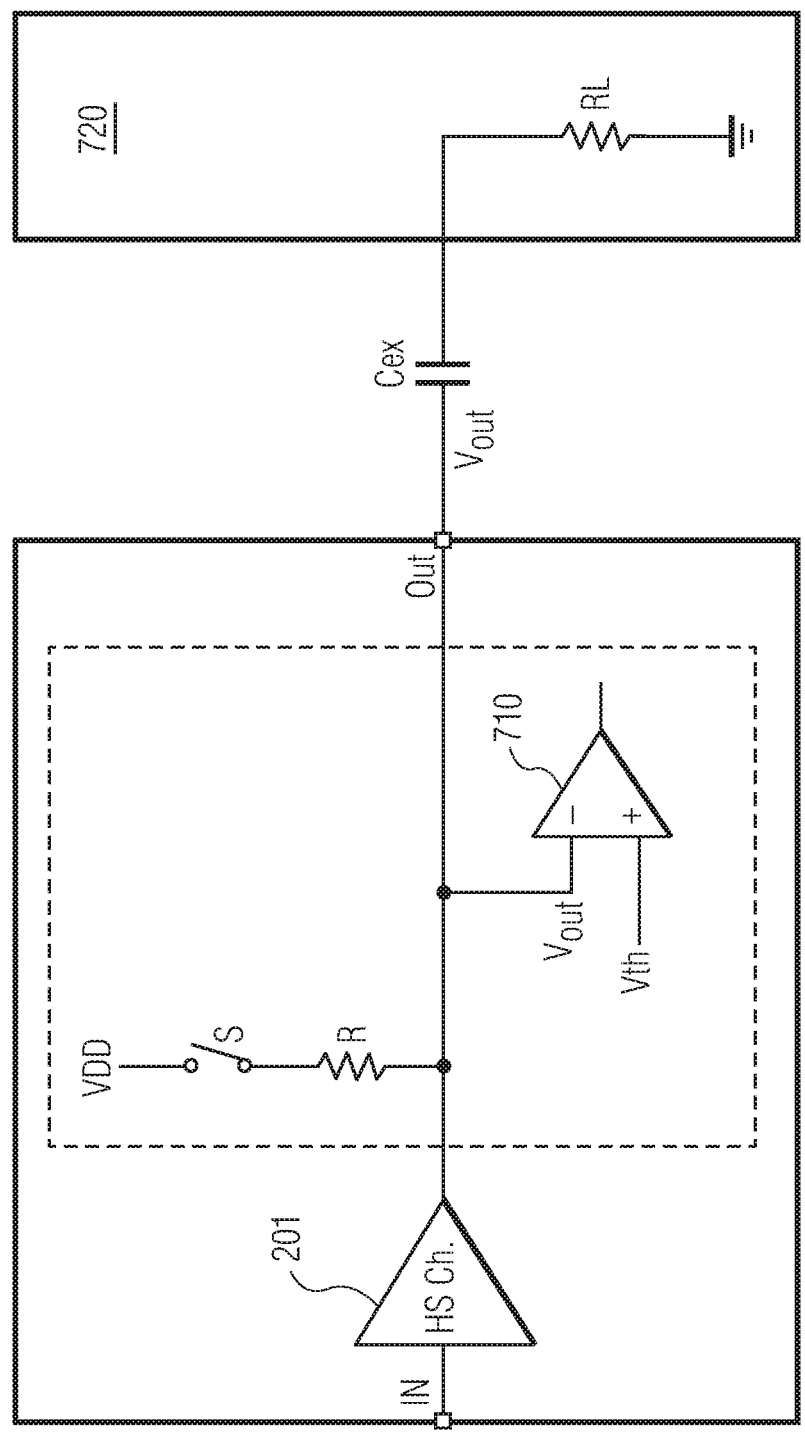
FIG. 7A illustrates an embodiment of a far-end termination detector.

Referring to FIG. 7A, the far-end termination detector (or the RX detector) 233 includes a comparator 710 that compares a voltage on the high-speed channel with a predetermined threshold voltage $V_{th}$. The threshold voltage $V_{th}$ corresponds to a value that allows a termination to be detected on the channel. During a time when the channel is disabled, a voltage supply $V_{DD}$ is coupled to the high-speed channel (shown in non-differential form for purposes of illustration) through a switch S and a resistor R (e.g., R may be in the kΩ). As a result, a predetermined voltage is applied to the high-speed channel 201 and the RX detector 233 performs a monitoring operation. The voltage at the node "Out" may be $(R_L/(R_L+R)*V_{DD}$.

When no termination is detected on the channel 201 (e.g., when a device is not coupled to the channel), which means $R_L$ is a larger value (e.g., a few kΩ), then the voltage at Vout will be high. When the high voltage is larger than Vth, then the output of comparator 710 will be zero. As a result, the RX detector 233 may output a logical zero value and continue monitoring the channel. When a termination is detected (e.g., when a device 720 including a termination resistor $R_L$ of 50Ω is detected on the channel), then the output voltage Vout will be 50/(50+R)*VDD, which is small and lower than Vth. As a result, the RX detector 233 may output a logical one value to enable one or more other circuits in the redriver chip (e.g., squelch detector 215) and/or to notify the controller 250 of the same. The controller may then activate circuits of the redriver to enable the high-speed channel.

Figure 7B:
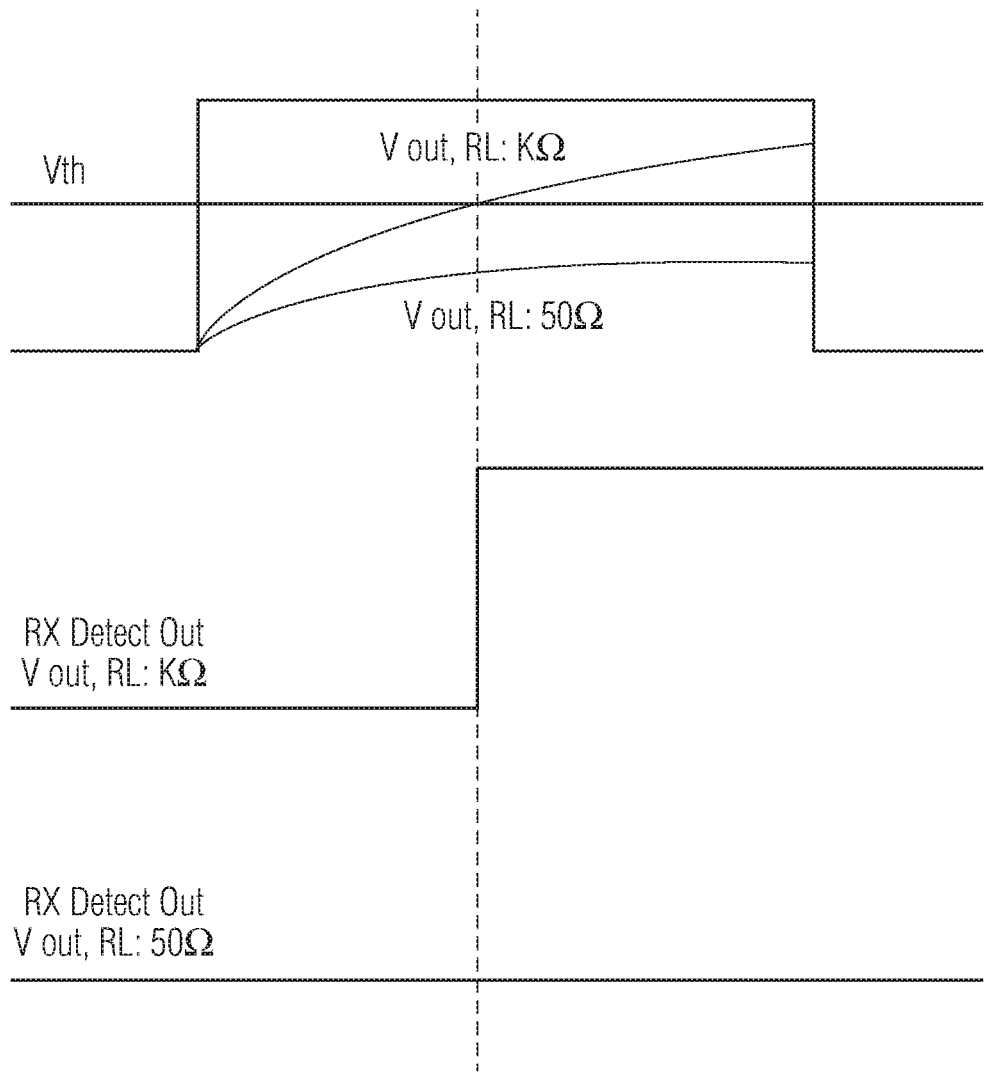
FIG. 7B illustrates an embodiment of a timing diagram for the far-end termination detector.

FIG. 7B illustrates an example of a timing diagram that may further explain how a far-end termination may be detected by the RX detector 233. In this embodiment, the detection principle is based on the rate of change in the "out" voltage of the high-speed channel 201 for various termination resistor ($R_L$) values, for example, using charging resistor R in the kΩ range. The RC time constant defines that the far-end termination is 50Ω (or kΩ range) termination. When switch S is enabled, Vout (the voltage on the output pin OUT of the redriver) will be a divide ratio of R (in the redriver chip) and RL (in the connected device 720). If $R_L$=50Ω, Vout will be below the threshold reference of the comparator 710 in a certain time frame. As a result, the RX detector 233 will output a logical zero value. If $R_L$ is kΩ range resistor, Vout will be higher than threshold reference of comparator 710. As a result, the RX detector 233 will output a logical 1 value, indicating that a signal has been detected on the channel 201 and that the channel (redriver) circuits should be enabled. The controller 250 may control the on/off state of the switch S and may also control enabling of the high-speed channel and driver circuits.

In one embodiment, the RX detector 233 may perform its monitoring function periodically, instead of continuously. This may be accomplished by enabling the RX detector 233 periodically based on control signals from the controller 250 and/or other circuits in the redriver chip. As a result, the average current consumption of the RX detector (and thus the redriver chip) may be reduced compared with the case where the RX detector is continuously maintained in an enabled state. For example, considering that a battery-operated device may not stay connected to a cable for very long, enabling the RX detector 233 on a continuous basis would consume unnecessary amounts of current. On the other hand, periodic enabling may reduce power consumption considerably.

Periodic Enabling of Squelch Detector

The squelch detector 215 performs signal detection on the high-speed channel 201. Like the RX detector 233, the squelch detector 215 may perform this detection operation periodically, instead of continuously, and/or asynchronously when a detect signal is received from the RX detector. For example, after the RX detector 233 detects a far-end termination, the RX detector 233 may output a detect signal to enable the squelch detector. Once enabled, the squelch detector 215 detects an incoming signal (e.g., low-frequency signal and/or high frequency signal) on the high-speed channel. Enabling the squelch detector periodically or asynchronously when a detect signal is received from the RX detector 233 (or controller 250) causes the redriver to consume less power, compared to the case where the squelch detector is maintained in a continuously enabled state continuously, even at times when the high-speed channel is disabled.

Figure 8:
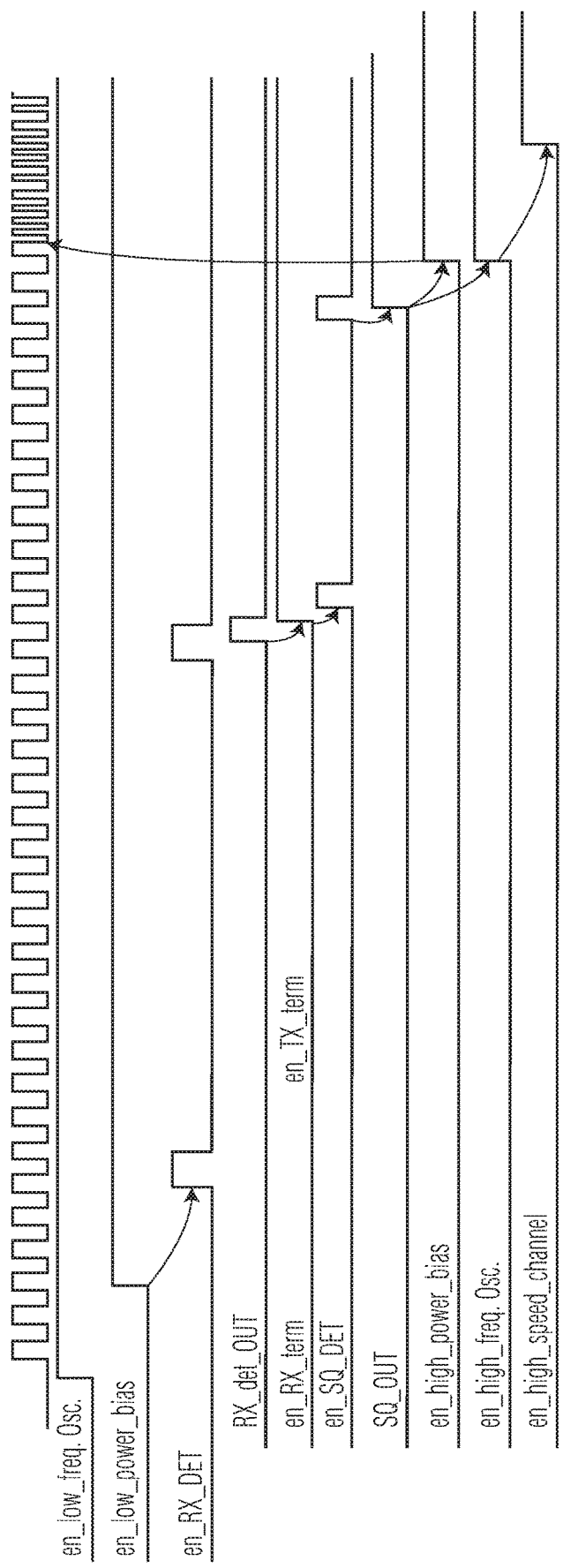
FIG. 8 illustrates an embodiment for periodically enabling one or more redriver detectors.

FIG. 8 illustrates an embodiment of a timing diagram showing how the RX detector 233 and squelch detector 215 may be periodically enabled. This timing diagram may also show how the high-speed channel 201 may be enabled in accordance with one embodiment.

Referring to FIG. 8, when a first enable signal (en_low-freq Osc) transitions from low to high, an oscillator (e.g., FRO 310) begins generating a clock signal at the second (low) frequency (e.g., 4.8 MHz), as previously discussed. Then, a second enable signal (en_low_power_bias) is generated to enable the bias circuit(s) of the redriver. Subsequently, a third enable signal (en_RX_DET) is generated to enable the RX detector 233. The third enable signal may have a relatively short pulse duration, after which the RX detector 233 is disabled until the third enable signal is applied again according to a predetermined period.

During the duration of the third enable signal, the RX detector 233 is able to detect a termination on the high-speed channel. When this occurs, the RX detector 233 generates a detect signal (RX_det_OUT) which activates an en_RX__term signal. When the en_RX_term signal goes high, the controller 250 periodically applies an enable signal (en_SQ__DET) for the squelch detector 215. The squelch detector enable signal may be a pulse of a predetermined duration. When the squelch detector enable signal is high, the squelch detector is able to detect the presence of a signal on the high-speed channel. As is evident from the timing diagram of FIG. 8, the squelch detector 215 detects a signal on the high-speed channel during the duration of the second pulse en_SQ_DET.

When the squelch detector 215 detects a signal on the high-speed channel, the output of the squelch detector (SQ_OUT) transitions from a logical zero value to a logical one value. When the controller 250 detects the logical one value of the squelch detector output, the controller 250 generates enable signals for the bias circuit to apply bias to equalizer 214, gain stage 216, second stage 220, and transmission driver 231.

At the same time, the controller 250 may generate an enable signal (en_high_freq Osc) to increase the clock signal to the first (high) frequency (e.g., 48 MHz), as previously discussed. When the clock signal reaches the first (high) frequency, the controller 250 generates an enable signal (en_high_speed_channel) to enable the high-speed channel 201. The high-speed channel may be considered to be enabled when power to the high-speed channel circuits transition from a low-power mode to a normal or active mode or otherwise when the high-speed channel is enabled.

Self-Bias Circuit(s)

The bias circuit(s) in the redriver chip may consume DC current when some of the circuits of the redriver chip are in a disabled state. Designing some of the redriver circuits to be self-biased may increase their start-up times, which may reduce power consumption. Examples of the redriver chip circuits that may be self-biased include the squelch detector, e.g., the squelch detector may be self-biased for use-cases including TBT and CIO standards. The CMK circuits 211 and 232 including the resistor divider illustrated in FIG. 6B may also be self-biased. In one embodiment, a circuit may be considered to be self-biased when it does not require bias current from bias circuit(s), for example, as discussed in relation to FIG. 5. Rather, such a circuit has its own bias generator. The bias circuits of FIG. 5 may consume a fixed DC current in the OTAs and I_lb and I_hb branches when enabled.

All of the power-saving techniques discussed above may be applied simultaneously and/or in a predetermined order to optimize a reduction in the power consumed by the redriver chip relative to one or more of the high-speed channels. In one embodiment, a subsequent of these power-saving techniques may be applied simultaneously or in a predetermined order to reduce power consumption.

Figure 9:
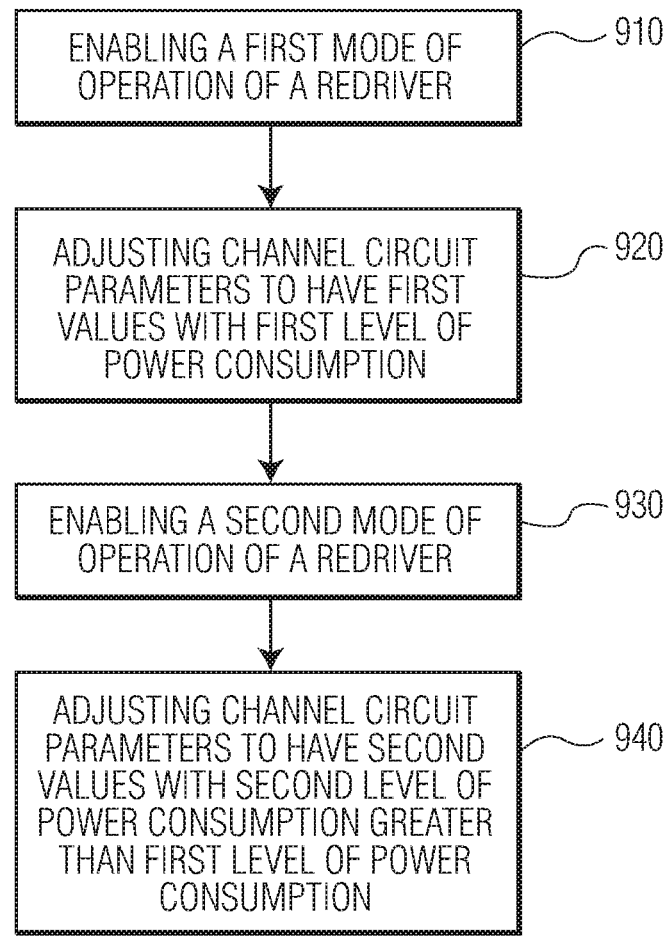
FIG. 9 illustrates an embodiment of a method for managing power in a redriver.

FIG. 9 illustrates an embodiment of a method for controlling power in a redriver chip, which, for example, may be the combination redriver chip of FIG. 2 and subsequent circuits and timing diagrams illustrated in FIGS. 3-8. In this method, all of the power-saving techniques previously described may be applied simultaneously or in a predetermined order, either entirely or partially.

At 910, the method includes enabling a first mode of operation of a redriver. The first mode of operation may be a low-power mode occurring either at start up, detection of a signal on a channel (e.g., high-speed channel) of the redriver, before enabling of the channel, a battery saving mode, or at another time after start-up.

At 920, a set of parameters of circuits coupled to the channel are adjusted to have first values during the first mode of operation. The first values cause the redriver to consume a first level of power consumption. The circuits may be any of those previously described, including but not limited to at least one signal detector, at least one common-mode keeper, a circuit to generate or select a clock signal, and at least one circuit operating based on a bias current. The first values of the set of parameters may include a frequency of the clock signal, an enable state of the at least one signal detector, a current level of the at least one common-mode keeper, and a current level of the at least one circuit operating based on the bias current.

At 930, a second mode of operation of the redriver is enabled. The second mode of operation may be, for example, a normal or active operational mode of the redriver. In one embodiment, the second mode of operation may be another low-power mode or a mode different from the first mode of operation. A controller (e.g., controller 250) may control changing the first mode of operation to the second mode of operation. The first and second modes of operation may be in succession or may be separated one one or more other operational modes of the redriver.

At 940, the set of parameters of the circuits coupled to the channel are adjusted to have second values during the second mode of operation. The second values cause the redriver to consume a second level of power consumption greater than the first level of power consumption. For example, the first value of the clock signal may be a first frequency and the second value of the clock signal may be a second frequency, where the first frequency is lower than the second frequency. In this or another embodiment, the first value of the enable state of the at least one signal detector may control periodic enabling of the at least one signal detector, and the second value of the enable state of the at least one signal detector may control periodic enable or continuous enabling of the at least one signal detector. The at least one signal detector may include at least one of a receiver detector and a squelch detector. In this or another embodiment, the first value of the current level of the at least one common-mode keeper may be lower than the second value of the current level of the at least one common-mode keeper. In this or another embodiment, the first value of the current level of the at least one circuit operating based on the bias current may be less than the second value of the current level of the at least one circuit operating based on the bias current. In this or another embodiment, at least one of the circuits coupled to the channel may be self-biased.

Figure 10:
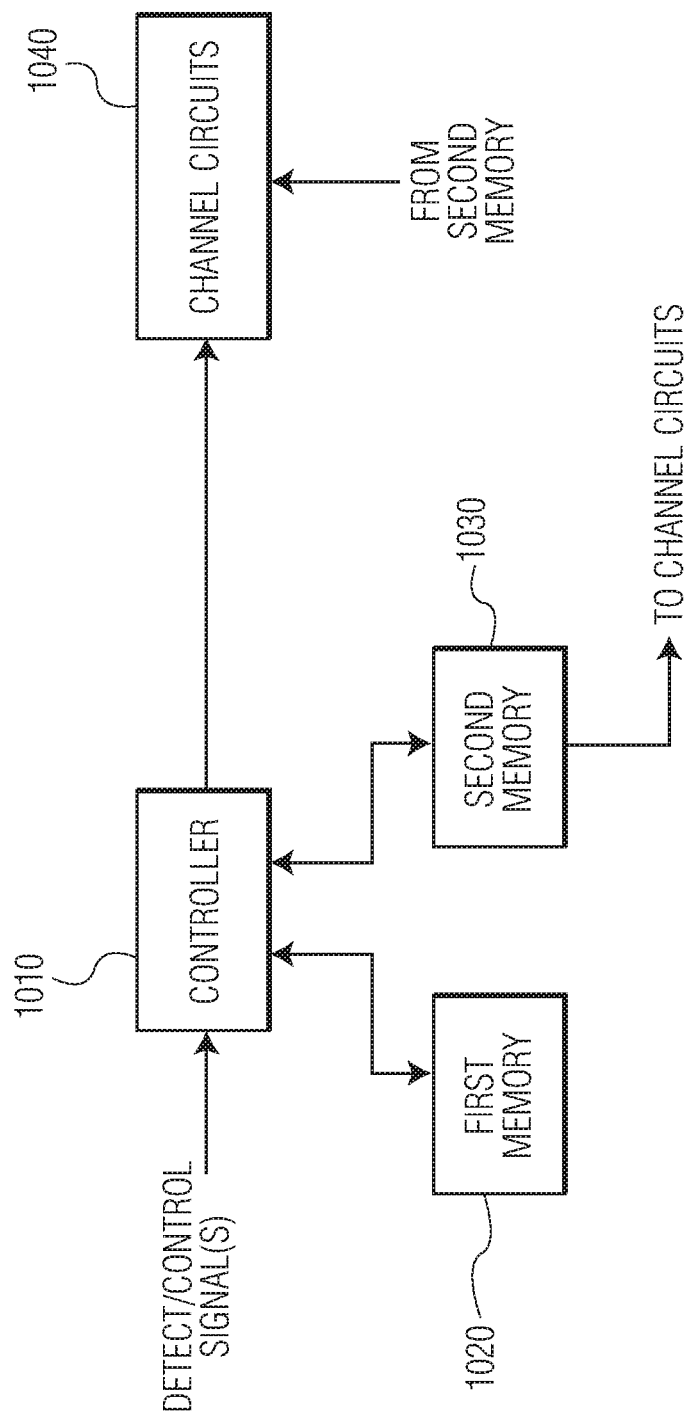
FIG. 10 illustrates an embodiment of a system for managing power in a redriver.

FIG. 10 illustrates an embodiment of a system which includes a controller 1010, a first memory 1020, and a second memory 1030. The controller 1010 may correspond, for example, to the controller 250 in FIG. 2. The first memory 1020 may include a non-transitory computer-readable medium that stores instructions cause the controller to perform the operations of the redriver and method embodiments described herein. The second memory 1030 may store the first and second values of the parameters of the channel circuits 1040 of the redriver. These values may be input into the controller 1010 for adjusting the parameters of the channel circuits. In one embodiment, at least some the values stored in the second memory 1030 may be output directly to the channel circuits adjusting the parameters. In operation, the instructions stored in the first memory 1020 may cause the controller 1010 to adjust the channel circuit parameters based on the first and second values stored in the second memory 1030, for example, depending on the operational mode of the redriver being implemented. One or more of these operations may be performed based on the detect or control signals described herein, e.g., signals output from the RX detector and/or squelch detector as previously discussed.

In accordance with one or more of the aforementioned embodiments, a redriver chip includes a controller and a plurality of circuits coupled to a channel. The controller adjusts a set of parameters of the circuits to have first values during a first mode of operation and second values during a second mode of operation. The first mode of operation many be any one of a number of low-power modes implemented at start-up or another time, either before or after the channel is enabled. The first values generate a first level of power consumption during the first mode of operation, and the second values generate a second level of power consumption during the second mode of operation. The first level of power consumption may be lower than the second level of power consumption.

The controllers, processors, equalizers, gain features, detectors, keepers, drivers, logic, comparators, enablers, and other signal-generating and signal-processing features of the embodiments disclosed herein may be implemented in logic which, for example, may include hardware, software, or both. When implemented at least partially in hardware, the controllers, processors, equalizers, gain features, detectors, keepers, drivers, logic, comparators, enablers, and other signal-generating and signal-processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, controllers, processors, equalizers, gain features, detectors, keepers, drivers, logic, comparators, enablers, and other signal-generating and signal-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:
1. A redriver chip, comprising:
   a channel;
   a plurality of circuits coupled to the channel comprising:
      at least one signal detector;
      at least one common-mode keeper;
      a circuit to generate or select a clock signal, and
      at least one circuit operating based on a bias current; and
   a controller configured to adjust each of a set of parameters of the plurality of circuits to have first values during a first mode of operation and to adjust the set of parameters to have second values during a second mode of operation, wherein the first values are to generate a first level of power consumption during the first mode of operation and the second values are to generate a second level of power consumption during the second mode of operation, the first level of power consumption lower than the second level of power consumption and the first mode of operation corresponding to a low-power mode of the redriver chip, wherein the set of parameters include at least;
      a frequency of the clock signal;
      an enable state of the at least one signal detector;
      a current level of the at least one common-mode keeper; and
      a current level of the at least one circuit operating based on the bias current.

2. The redriver chip of claim 1, wherein the controller is configured to perform the low-power mode before the channel is enabled.

3. The redriver chip of claim 1, wherein:
   the first value of the clock signal is a first frequency,
   the second value of the clock signal is a second frequency, and
   the first frequency is lower than the second frequency.

4. The redriver chip of claim 1, wherein:
   the first value of the enable state of the at least one signal detector is to control periodic enabling of the at least one signal detector, and
   the second value of the enable state of the at least one signal detector is to control periodic enable or continuous enabling of the at least one signal detector.

5. The redriver chip of claim 4, wherein the at least one signal detector includes at least one of a receiver detector and a squelch detector.

6. The redriver chip of claim 1, wherein the first value of the current level of the at least one common-mode keeper is lower than the second value of the current level of the at least one common-mode keeper.

7. The redriver chip of claim 1, wherein the first value of the current level of the at least one circuit operating based on the bias current is less than the second value of the current level of the at least one circuit operating based on the bias current.

8. The redriver chip of claim 1, wherein at least one of the plurality of circuits is self-biased.

9. A method for managing power, comprising:
enabling a first mode of operation of a redriver;
adjusting a set of parameters of a plurality of circuits to have first values during the first mode of operation, the plurality of circuits coupled to a channel of the redriver, the plurality of circuits comprising at least one signal detector, at least one common-made keeper, a circuit to generate or select a clock signal, and at least one circuit operating based on a bias current;
enabling a second mode of operation of the redriver; and
adjusting the set of parameters of the plurality of circuits to have second values during the second mode of operation, wherein the first values are to generate a first level of power consumption during the first mode of operation and the second values are to generate a second level of power consumption during the second mode of operation, the first level of power consumption lower than the second level of power consumption, and wherein the first mode of operation corresponds to a low-power mode of the redriver, wherein the set of parameters includes at least a frequency of the clock signal, an enable state of the at least one signal detector, a current level of the at least one common-mode keeper, and a current level of the at least one circuit operating based on the bias current.

10. The method of claim 9, wherein the low-power mode is enabled before the channel is enabled.

11. The method of claim 9, wherein at least one of the plurality of circuits is self-biased.

12. The method of claim 9, wherein:
the first values include a first value of the clock signal corresponding to a first frequency,
the second values include a second value of the clock signal corresponding to a second frequency, and
the first frequency is lower than the second frequency.

13. The method of claim 9, wherein:
the first value include a first value of the enable state of the at least one signal detector that controls periodic enabling of the at least one signal detector, and
the second values include a second value of the enable state of the at least one signal detector that controls periodic enabling or continuous enabling of the at least one signal detector.

14. The method of claim 13, wherein the at least one signal detector includes at least one of a receiver detector and a squelch detector.

15. The method of claim 9, wherein:
the first values include a first value of the current level of the at least one common-mode keeper;
the second value include a second value of the current level of the at least one common-mode keeper that is higher than the first value of the current level of the at least one common-mode keeper.

16. The method of claim 9, wherein:
the first values include a first value of the current level of the at least one circuit operating based on the bias current,
the second values include a second value of the current level of the at least one circuit operating based on the bias current that is higher than the first value of the current level of the at least one circuit operating based on the bias current.

\* \* \* \* \*